United States Patent [19]

Davis

[11] 4,401,417
[45] Aug. 30, 1983

[54] HYDRAULIC PUMP AND IMPROVED FLOW CONTROL VALVE ASSEMBLY FOR USE THEREIN

[75] Inventor: Michael D. Davis, Coldwater, Mich.

[73] Assignee: Eaton Corporation, Cleveland, Ohio

[21] Appl. No.: 201,650

[22] Filed: Oct. 28, 1980

[51] Int. Cl.³ .............................................. F04B 49/08
[52] U.S. Cl. .................................. 417/300; 417/310; 251/175
[58] Field of Search ....................... 417/300, 307, 310; 251/175, 334; 277/236, 212 C

[56] References Cited

U.S. PATENT DOCUMENTS

| | | | |
|---|---|---|---|
| 2,471,285 | 5/1949 | Rice | 251/78 |
| 2,970,804 | 2/1961 | Busby et al. | 251/175 |
| 3,385,220 | 5/1968 | Dymond | 417/300 |
| 3,930,759 | 1/1976 | Drutchas | 417/283 |
| 4,298,316 | 11/1981 | Strikis | 417/310 |

*Primary Examiner*—Richard E. Gluck
*Attorney, Agent, or Firm*—C. H. Grace; L. J. Kasper

[57] ABSTRACT

A rotary pump and flow control valve assembly (73) are disclosed. The pump includes a pumping element (17) defining fluid pockets (31), a discharge port (59) and a discharge fluid path (57). The flow control valve assembly is disposed in a valve bore (71) and includes a valve spool (83) having a spool land (105) disposed between the discharge path and a bypass bore (81). The spool land includes a cylindrical wall portion (109) and an annular wall portion (111) extending from the spool to the cylindrical wall portion. The wall portions define an annular fluid chamber (115) in communication with the discharge path. The wall portions are relatively thin such that the cylindrical wall portion expands radially when the annular fluid chamber communicates with fluid at relatively higher fluid pressure. The result is a reduction in the normal clearance between the cylindrical wall portion and the valve bore, reducing leakage past the spool land.

7 Claims, 7 Drawing Figures

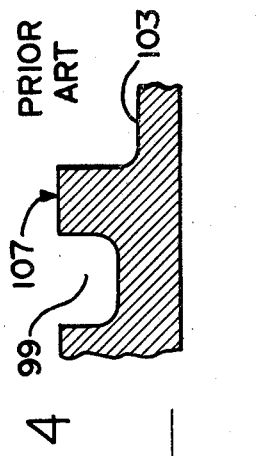
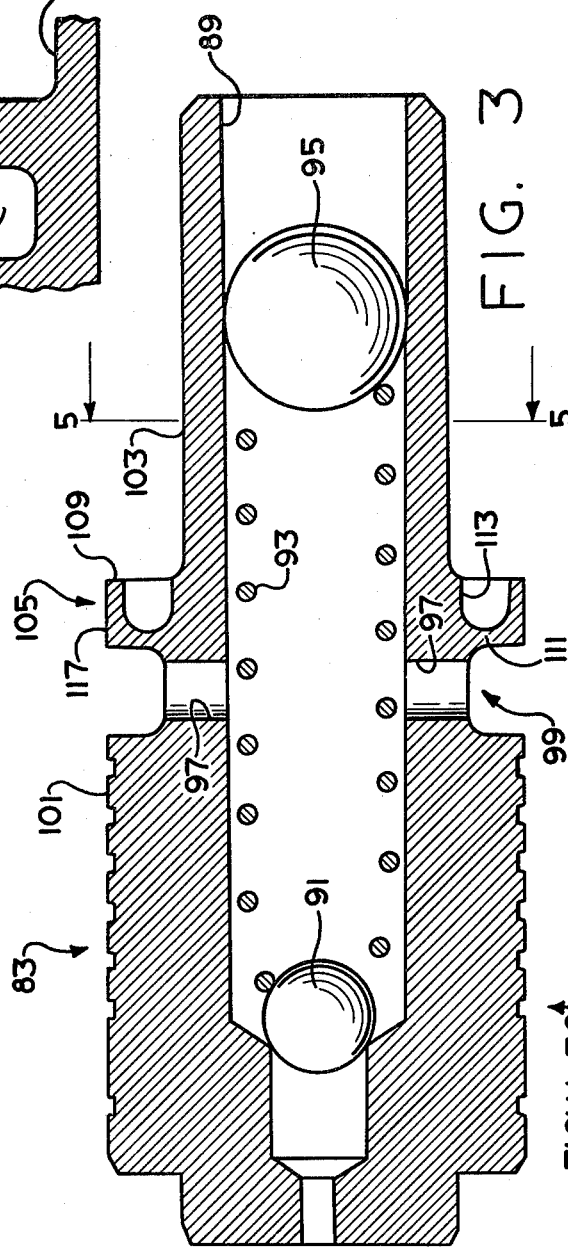
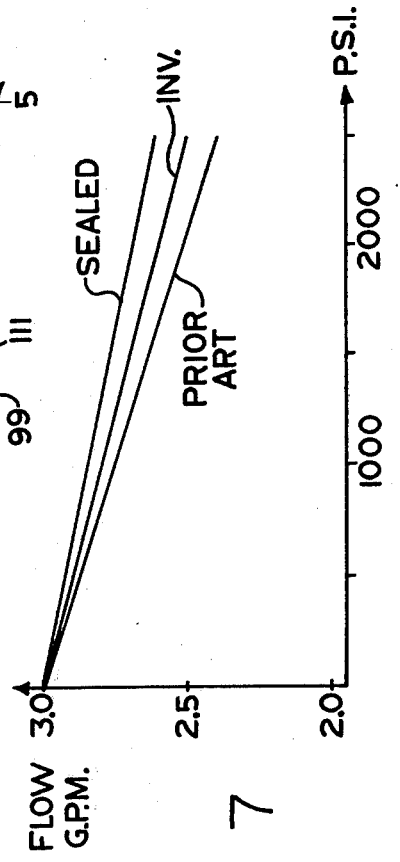

HYDRAULIC PUMP AND IMPROVED FLOW CONTROL VALVE ASSEMBLY FOR USE THEREIN

BACKGROUND OF THE DISCLOSURE

The present invention relates to positive displacement hydraulic pumps of the type which may be utilized in vehicle power steering systems, and more particularly, to such pumps which include a flow control valve assembly to bypass excess output fluid.

In vehicle power steering systems, positive displacement, rotary pumps are ordinarily employed for supplying pressurized fluid to a power steering control device, with the pump being driven by the vehicle engine, and operating over a widely varying range of speeds.

Hydraulic pumps of the type to which the present invention relates include a housing defining a pumping chamber and a pumping element disposed therein. The housing defines an inlet port communicating with expanding pumping chambers, and an outlet port communicating with contracting pumping chambers. The housing further includes a discharge port which may be connected to a fluid operated device, such as the power steering control unit.

In pumps of the type described above, the volume of fluid flowing from the outlet port increases proportionally as the speed of the engine increases. Therefore, in conventional power steering systems, a flow control valve assembly is disposed in the flow path between the outlet port and the discharge port. The flow control valve is typically responsive to a fluid pressure differential generated across a metering orifice through which discharge fluid flows. The flow control valve assembly establishes a predetermined maximum flow rate from the discharge port, with all excess fluid being bypassed back to the inlet port.

Typically, the flow control valve assembly includes a spool valve movably disposed in a valve bore, and including a spool land disposed between the discharge fluid path and a bypass port, through which excess fluid is recirculated. Below the flow control setting (e.g., 2.5 gpm), the flow control spool land prevents communication from the discharge fluid path to the bypass flow path. When the fluid pressure in the discharge fluid path is relatively high (e.g., 2000 psi), there is a tendency for substantial fluid leakage from the discharge fluid path, through the clearance between the spool land and valve bore, to the bypass flow path. This leakage results in a loss of flow from the discharge port, thus reducing the volumetric efficiency of the pump, and the hydraulic horsepower delivered to the fluid operated device.

SUMMARY OF THE INVENTION

Accordingly, it is an object of the present invention to provide a flow control valve assembly for a pump of the type described which is effective to substantially reduce the leakage problem described above.

It is a more specific object of the present invention to provide a flow control valve which accomplishes the above-stated object without the difficulty and expense of substantially more precise machining of the spool land and valve bore.

The above and other objects of the invention are accomplished by the provision of an improved rotary pump and flow control valve assembly of the type described above. The improvement comprises the spool land including a generally cylindrical wall portion, the outer surface of which cooperates with the valve bore to define a normal cylindrical clearance in the absence of substantial fluid pressure in the discharge fluid path. The spool land further includes an annular wall portion extending radially from the valve spool to the cylindrical wall portion. The annular and cylindrical wall portions cooperate with the valve spool to define an annular fluid chamber in communication with the discharge fluid path. The annular and cylindrical wall portions are relatively thin whereby the cylindrical wall portion expands radially, reducing the normal cylindrical clearance when the annular fluid chamber is exposed to relatively higher fluid pressure.

BRIEF DESCRIPTION OF THE DRAWINGS

FIG. 3 is an enlarged, axial cross section of the flow control valve spool of the present invention.

FIG. 4 is a fragmentary, axial cross section, similar to FIG. 3, illustrating the "PRIOR ART" flow control valve spool.

FIG. 7 is a graph of flow versus pressure comparing the present invention to the PRIOR ART, and to a test device in which leakage is positively prevented.

DESCRIPTION OF THE PREFERRED EMBODIMENT

Figure 1:
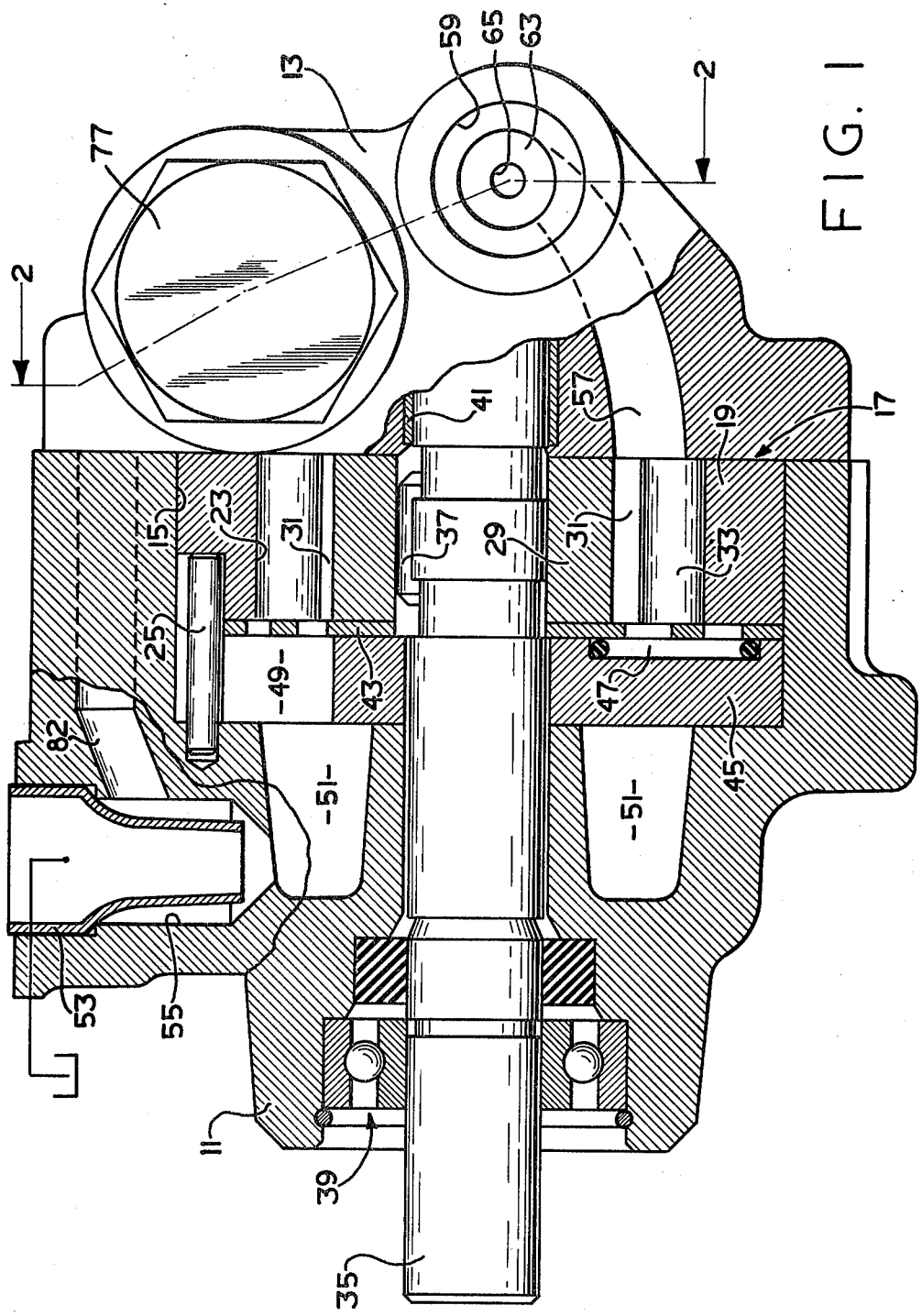
FIG. 1 is a view partly in elevation and partly in axial cross section of a rotary pump of the type with which the present invention may be utilized.

Referring now to the drawings, which are not intended to limit the invention, FIG. 1 is a view, primarily in cross section, of a typical automotive power steering pump of a type which is commercially available and therefore, will be described only briefly.

The pump comprises several major portions, including a body portion 11 and a cover portion 13. The body portion 11 defines an annular pumping chamber 15, and disposed within the chamber 15 is a pumping section 17. The pumping section 17 includes a cam ring 19 which defines an internal cam surface 23. The cam ring 21 is held in proper circumferential alignment, relative to the body portion 11 and cover portion 13, by means of an axial pin 25. The cam ring 21 is held in tight sealing engagement between the adjacent surfaces of the body portion 11 and cover portion 13 by means of a plurality of bolts 27 (not shown).

Disposed within the cam ring 21 is a rotatable pumping element (rotor) 29, which defines a plurality of radially extending pumping chambers 31, each of which contains a cylindrical roller 33, as is well known in the art.

The pump includes an input shaft 35 which is capable of transmitting a rotary motion, such as from the vehicle engine, to the rotor 29, by means of a suitable pin connection 37. The input shaft 35 is supported for rotation within the body portion 11 by a suitable bearing set 39, and is supported for rotation within the cover portion 13 by a suitable bushing member 41. As the rotor 29 rotates, the rollers 33 remain in engagement with the cam surface 23, which is configured to cause each of the rollers 33 to move radially outwardly and inwardly to accomplish fluid intake and fluid discharge, respectively, as is well known in the art. It should be apparent to those skilled in the art that the present invention is described in connection with a roller-vane pumping element by way of example only, and that the invention is equally advantageous when used with various other types of pumping sections, for example, sliding vane, slipper, and others.

Referring still to FIG. 1, the pumping section 17 includes a flexible end plate (port plate) disposed adjacent the left end of the cam ring 19 and rotor 29. Disposed adjacent the end plate 43 is a back-up plate 45 which defines a pair of kidney shaped pressure chambers 47 (only one of which is shown in FIG. 1), and a pair of cut-out portions 49 (only one of which is shown in FIG. 1). It will be understood by those skilled in the art that not all portions of FIG. 1 are taken on the same plane, but instead, the various elements are positioned as shown in FIG. 1 for the purpose of illustrating all of the important parts of the pump in a single view.

The body portion 11 defines a pair of diametrically opposed inlet chambers 51, each of which is in fluid communication with a system reservoir by means of a reservoir fitting 53, which is seated within a stepped bore 55 defined by the body portion 11. Therefore, inlet fluid flows from the system reservoir, through the reservoir fitting 53 into the inlet chambers 51. Inlet fluid flows from the chambers 51, through the respective cut-out portions 49, and into the pumping chambers 31 which are expanding. At the same time, pressurized fluid is pumped from the pumping chambers 31 which are contracting, and enters a discharge chamber 57 which is in fluid communication with a discharge port 59 defined by the cover portion 13.

Figure 2:
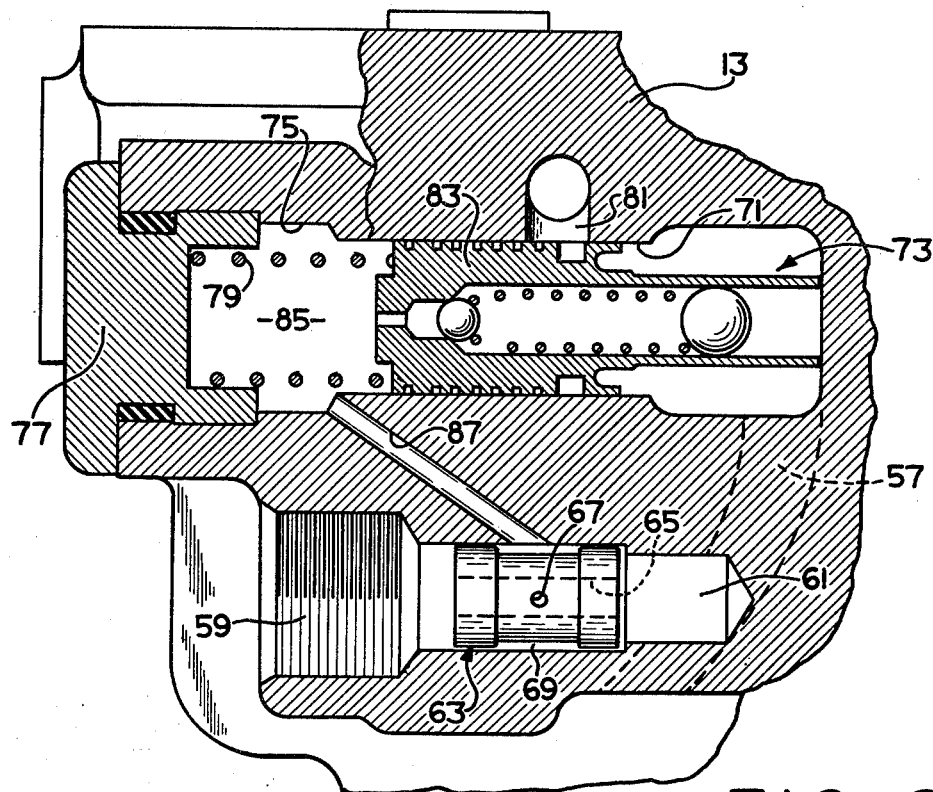
FIG. 2 is a transverse cross section taken on line 2—2 of FIG. 1, illustrating the flow control valve of the present invention.

Referring now to FIG. 2, the discharge fluid path and the flow control valve assembly will be described generally. The cover portion 13 defines a discharge bore 61 which, at its right end in FIG. 2, is in fluid communication with the discharge chamber 57. The discharge bore 61 terminates, at its left end in FIG. 2, in the discharge port 59 which is threaded to permit insertion of a threaded conduit fitting. The conduit provides for fluid communication to the fluid operated device. Disposed within a stepped portion of the discharge bore 61 is an orifice member 63 which defines an axial, generally cylindrical flow orifice 65 and a radial passage 67 which permits fluid communication between the orifice 65 and an annular, relieved area 69.

The cover portion 13 further defines a valve bore 71 which also is in fluid communication with the discharge chamber 57. Disposed within the valve bore 71 is a flow control valve assembly, generally designated 73. The valve bore 71 terminates, at its left end in FIG. 2, in an internally threaded portion 75 which is in threaded engagement with a plug 77. The plug 77 serves as a seat for a biasing spring 79 which biases the valve assembly 73 toward the right in FIG. 2. The cover portion 13 defines an angled bore 81 in fluid communication with the valve bore 71. The bore 81 communicates by means of an axial bore 82 in the body portion 11 (shown in FIG. 1) with the stepped bore 55. Thus, the bore 81 and the axial bore 82 define a bypass flow path whereby excess fluid is communicated from the discharge chamber 57, past the flow control valve assembly 73, and back through the bore 55 into the inlet chambers 51.

The flow control valve assembly 73 includes a valve spool 83 which cooperates with the threaded plug 77 and valve bore 71 to define a pressure signal chamber 85. The signal chamber 85 is in fluid communication with the flow orifice 65 by means of the radial passage 67, the relieved area 69, and an angled bore 87. Therefore, pressurized fluid flows through the discharged chamber 57, the discharge bore 61, the flow orifice 65, and out the discharge port 59. The flow through the orifice 65 results in a pressure differential between the fluid in the chamber 57 which biases the valve spool 83 to the left, and the pressure in the orifice 65 which is communicated to the chamber 85 and biases the valve spool 83 to the right. As is well known in the art, below the flow control setting, i.e., below the maximum desired flow rate, the pressure differential acting on the valve spool 83 is less than the equivalent force of the biasing spring 79, and the valve spool 73 is biased toward its normally closed position shown in FIG. 2. In the closed position of the flow control valve, fluid communication from the chamber 57 to the bypass bore 81 is substantially blocked, and all of the fluid discharged from the pumping section 17 flows out through the discharged port 59.

As the engine speed increases, the speed of rotation of the input shaft 35 and rotor 29 increases, thus increasing the flow output of the pumping section 17. When the output of the pumping section reaches the flow control setting, the pressure differential across the valve spool equals or slightly exceeds the biasing force of the spring 79, and the valve spool 83 begins to move to the left in FIG. 2, permitting just enough bypassing of fluid from the chamber 57 to the bypass bore 81 to maintain the flow rate out of the discharge port 59 at the maximum desired rate.

Referring now primarily to FIG. 3, the valve spool 83 defines a bore 89, within which is disposed a relief valve member 91, normally biased into engagement with its valve seat by a spring 93. The spring 93 is seated at its opposite end against a retaining ball 95, which is press-fit into the bore 89. The valve spool 83 defines a pair of radially-extending relief passages 97 communicating between the bore 89 and an annular groove 99. The relief function of the flow control valve assembly 73 forms no part of the present invention and will not be described further herein. However, the relief operation is described in great detail in U.S. Pat. No. 3,385,220, assigned to the assignee of the present invention, and incorporated herein by reference.

The valve spool 83 includes a relatively larger land portion 101 which is closely spaced apart within the valve bore 71. The valve spool 83 further defines a relatively smaller diameter portion 103. Disposed between the annular groove 99 and the smaller portion 103 is a sealing land, generally designated 105. It is the configuration and function of the sealing land 105 which comprise the primary aspects of the present invention.

Referring now to FIG. 4, there is illustrated a fragmentary view of the PRIOR ART flow control valve spool, showing the annular groove 99 and some of the smaller diameter portion 103. Disposed therebetween is a sealing land 107 which, in accordance with the prior art, is of solid, rigid construction, having no capability of preventing leakage between the outer surface of the sealing land 107 and the bore 71.

Figure 6:
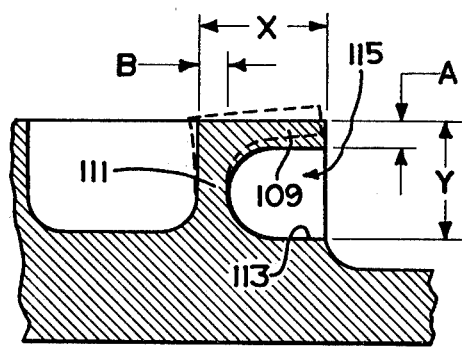
FIG. 6 is an axial cross section, similar to FIG. 3, but still further enlarged, illustrating both the normal and exanded positions of the spool land of the present invention.
Figure 5:
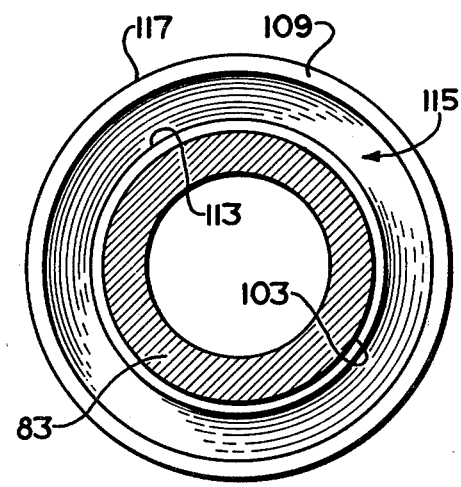
FIG. 5 is a transverse cross section, taken on line 5—5 of FIG. 3, and on the same scale as FIG. 3.

Referring now to FIGS. 5 and 6, in conjunction with FIG. 3, the sealing land 105 of the present invention will be described in greater detail. The sealing land 105 includes a cylindrical wall portion 109 and a radially-extending annular wall portion 111. The wall portions 109 and 111 cooperate with an adjacent spool surface portion 113 to define an annular fluid chamber 115, which is in fluid communication with the discharge chamber 57. The cylindrical wall portion 109 includes a cylindrical outer surface 117 which cooperates with the valve bore 71 to define therebetween a "normal" cylindrical clearance, when the fluid chamber 115 contains fluid at relatively low fluid pressure. When the discharge chamber 57 and annular fluid chamber 115 contain relatively lower fluid pressure, leakage between the outer surface 117 and valve bore 71 to the bypass bore 81 is not especially significant. As the discharge pressure in the chambers 57 and 115 rises to a relatively higher fluid pressure (e.g., 1000-2500 psi), leakage through the cylindrical clearance can become significant. However, with the flow control valve of the present invention, fluid pressure in the annular chamber 115 causes the wall portion 109 to expand radially, and the wall portion 111 to deflect. This expansion and deflection of the wall portions is illustrated by the dotted lines in FIG. 6, with the amount of expansion being greatly exaggerated for ease of illustration. As the wall portion 109 expands radially, the normal cylindrical clearance between the surface 117 and the valve bore 71 is reduced, thus reducing the leakage therebetween. During the development of the present invention, there have been instances observed wherein the outer surface 117 actually engaged the valve bore 71, over at least a portion of the circumference thereof, substantially preventing leakage past the land 105.

Referring now primarily to FIG. 6, it should be noted that for purposes of explaining the present invention, the axial length of the cylinderical wall portion 109 has been labeled "X," and the radial dimension from surface portion 113 to outer surface 117 has been labeled "Y." Also, the thickness of the wall portion 109 has been labeled "A" and the thickness (at the relatively thin portion) of the wall portion 111 has been labeled "B." Based upon experimentation performed during the course of developing the invention, it appears preferable for the dimensions X and Y to be approximately the same, and for the thicknesses A and B to be approximately the same.

EXAMPLE

By way of example only, a flow control valve spool was made in accordance with the present invention using a steel of the type commonly used for valve spools, and possessing the tyical mechanical properties (such as the modulus of elasticity) of such steels. In the example valve spool, the land portion 101 had a diameter of about 0.68 inches, while the smaller portion 103 had a diameter of about 0.50 inches. Both of the dimensions X and Y were in the range of about 0.080-0.100 inches, while both of the thicknesses A and B were in the range of about 0.020-0.030 inches. Using the above dimensions and thicknesses, it was calculated that the radial expansion of the wall portion 109 would be about 0.00026 inches, or that the total diametrical expansion would be about 0.00053 inches, at a discharge pressure of 1500 psi. The calculated expansion was verified during the course of actual testing by observing the pressure at which the axial position of the valve spool remained changed, i.e., the pressure at which the land expanded sufficiently to clamp within the valve bore.

Thus, with the example valve spool, and with a normal clearance of about 0.0005 inches between the land and the bore, it was observed that at a discharge pressure of 1500 psi, the axial position of the spool remained unchanged and leakage was substantially reduced, as compared to the prior art land design.

In order to measure the reduction in leakage resulting from the use of the invention, several different pumps of the type illustrated and described herein were tested, each one being operated with two different flow control valve spools which were identical in all ways, except that one of the valve spools was provided with the sealing land 105 of the invention, and the other was provided with the prior art sealing land 107. In each pump tested, the spools were precisely machined, such that the normal cylindrical clearances were the same, with and without the invention. The test procedure involved operating each pump at a given input speed, below the flow control setting, and over a range of discharge pressures from zero psi to 2500 psi. As may be expected, in those pumps in which the normal cylindrical clearance was near the low end of the tolerance range (about 0.0004-0.0005 inches), the observed leakage reduction was relatively smaller. However, in those pumps in which the normal clearance was toward the upper end of the tolerance range (0.0012 inches), the reduction in leakage was frequently in the range of 0.2-0.3 gpm.

Referring now to FIG. 7, there is illustrated a graph of discharge flow (gpm) versus discharge pressure (psi). The graph presents a comparison of the flow control valve of the invention ("INV.") versus the flow control valve of the type shown in FIG. 4 (PRIOR ART), and both of these are compared to a special test spool, made generally as shown in FIG. 4, but having an annular groove formed in the land 107, and an O ring disposed therein to positively prevent leakage between the land and the valve bore ("SEALED"). Thus, the graph of FIG. 7, which is intended as an overall summary of the test results, illustrates that of the total leakage permitted by the prior art valve spool (i.e., the difference between the discharge flows of the "SEALED" and PRIOR ART devices), the valve spool of the present invention eliminated approximately half of such leakage.

It should be apparent to those skilled in the art that the present invention provides an improved flow control valve spool in which a cylindrical wall portion expands when subjected to relatively higher pressures, thus reducing the normal clearance between the wall portion and the valve bore, and substantially reducing leakage therebetween. It is believed that upon a reading and understanding of the foregoing specification, various alterations and modifications of the invention will become apparent to those skilled to the art, and it intended that all such alterations and modifications should be included in the invention, insofar as they come within the scope of the appended claims.

What is claimed is:

1. A flow control valve assembly for use with a fluid delivery system of the type including a source of pressurized fluid having a fluid outlet port and a fluid operated apparatus, said flow control valve assembly comprising:

(a) housing means defining a discharge fluid path in fluid communication with the fluid outlet port, discharge port means in communication with said discharge fluid path and the fluid operated apparatus, a valve bore in fluid communication with said discharge fluid path, and another fluid path communicating between said valve bore and a region of fluid at a relatively lower fluid pressure;

(b) a metal valve spool movably disposed in said valve bore and having an integral spool land operable substantially to prevent fluid communication from said discharge fluid path to said another fluid path when the fluid delivery system is operating below a predetermined control setting, said valve spool being movable to a position wherein said spool land permits fluid communication from said discharge fluid path to said another fluid path when the fluid delivery system is operating at said predetermined control setting;

(c) said spool land comprising a generaly cylindrical wall portion, the outer surface therefore cooperating with said valve bore to define a generally cylindrical clearance, said spool land further comprising an annular well portion cooperating with said valve spool to define an annular fluid chamber in fluid communication with said discharge fluid path; and (d) said cylindrical and annular wall portions being sufficiently thin, and said annular wall portion being at least as thin as said cylindrical wall portion, to permit said cylindrical wall portion to expand radially, substantially reducing the normal cylindrical clearance between said outer surface and said valve bore, when said annular fluid chamber is in communication with fluid at relatively higher fluid pressure.

2. A flow control valve assembly for use with a fluid pumping apparatus of the type including a pump housing defining a fluid inlet port, a fluid outlet port and a pumping chamber, a pumping element disposed in the pumping chamber and defining expanding and contracting fluid pockets in fluid communication with the fluid inlet and outlet ports, respectively, said flow control valve assembly comprising:

(a) housing means defining a discharge fluid path in fluid communication with the fluid outlet port, a discharge port in communication with said discharge fluid path, a valve bore in fluid communication with said discharge fluid path, and a bypass flow path in fluid communication with said valve bore;

(b) a machined, metal valve spool movably disposed in said valve bore and having an integral, machined spool land operable to block fluid communication from said discharge fluid path to said bypass flow path when the flow rate through said discharge fluid path is below a predetermined flow control setting and to permit fluid communication from said discharge fluid path to said bypass flow path when said flow rate exceeds said flow control setting;

(c) said spool land comprising a generally cylindrical wall portion, the outer surface thereof cooperating with said valve bore to define a generally cylindrical clearance, said spool land further comprising an annular wall portion, said cylindrical and annular wall portions cooperating with said valve spool to define an annular fluid chamber in fluid communication with said discharge fluid path; and (d) said cylindrical and annular wall portions being sufficiently thin, and said annular wall portion being at least as thin as said cylindrical wall portion, to permit said cylindrical wall portion to expand radially, such that the outer surface thereof substantially engages said valve bore, when said annular fluid chamber contains fluid at relatively higher fluid pressure.

3. A flow control valve assembly as claimed in claim 1 or 2 wherein the diameter of the outer surface of said cylindrical wall portion increases in the range of about 0.0005 inches as the fluid pressure in said annular fluid chamber increases from zero to said relatively high fluid pressure.

4. A flow control valve assembly as claimed in claim 1 or 2 wherein said cylindrical wall portion and said annular wall portion have approximately the same thickness.

5. A flow control valve assembly as claimed in claim 4 wherein the thickness of said cylindrical and annular wall portions is in the range of about 0.020 inches to about 0.030 inches.

6. A flow control valve assembly as claimed in claim 1 or 2 wherein said cylindrical wall portion defines an axial dimension X, and said valve spool and said outer surface of said cylindrical wall portion define a radial dimension Y, said dimensions X and Y being approximately the same.

7. A flow control valve assembly as claimed in claim 6 wherein said dimensions X and Y are in the range of about 0.080 inches to about 0.100 inches.

* * * * *